US006314629B1

(12) United States Patent
Showalter, Sr. et al.

(10) Patent No.: US 6,314,629 B1
(45) Date of Patent: Nov. 13, 2001

(54) HAND TOOL FOR USE IN THE QUICK DISCONNECTION OF QUICK CONNECT/ DISCONNECT COUPLINGS

(76) Inventors: David Lee Showalter, Sr., 3308 Ridge Rd.; Darren J. Kady, 5111 Stony Point Rd., both of Barboursville, VA (US) 22923

( * ) Notice: Subject to any disclaimer, the term of this patent is extended or adjusted under 35 U.S.C. 154(b) by 0 days.

(21) Appl. No.: 09/579,057

(22) Filed: May 26, 2000

Related U.S. Application Data

(60) Provisional application No. 60/136,050, filed on May 26, 1999.

(51) Int. Cl.$^{7}$ .................................................... B23P 19/04

(52) U.S. Cl. .................................. 29/237; 7/125; 29/268; 81/423

(58) Field of Search ............................. 81/302, 418, 420, 81/424, 9.4; 29/234, 235, 237, 235.5, 268, 272

(56) References Cited

U.S. PATENT DOCUMENTS

| | | | | |
|---|---|---|---|---|
| 3,845,538 | * | 11/1974 | Demier | 29/234 |
| 4,174,560 | * | 11/1979 | Senior | 29/566.1 |
| 4,257,135 | * | 3/1981 | Moebius | 7/125 |
| 4,416,045 | * | 11/1983 | Staten | 29/229 |
| 4,475,418 | | 10/1984 | Tani . | |
| 4,571,808 | * | 2/1986 | King | 29/268 |
| 4,785,694 | * | 11/1988 | Burmester | 81/485 |
| 4,951,529 | | 8/1990 | Laurencot . | |
| 5,845,393 | * | 12/1998 | DePaiva | 29/751 |

* cited by examiner

*Primary Examiner*—Joseph J. Hail, III
*Assistant Examiner*—Daniel Shanley
(74) *Attorney, Agent, or Firm*—Sheldon H. Parker

(57) ABSTRACT

A tool is disclosed for the removal of quick release couplings from a conduit. The tool has a body that is divided into a rotatably connected gripping portion and a release portion. Handles are connected to the body to activate the clamping and releasing action of the tool. Compressing the handles causes the gripping element to compress and the gripping portion and the release portion to rotate around the connection, creating a distance between the gripping and release elements. The release element has a pair of plates with neither, one or both of the plates being movable. Preferably the top plate has a spring member that retains the top plate adjacent the lower plate, thereby enabling a conduit to snap in and be maintained between the two plates. The clamping member can have a flat surface or at least one arc, and in come embodiments, the receiving member is a mirror image of the clamping member. An optional guide can be used adjacent the clamping member to prevent side to side movement. The clamping member and release element can open at the top of the tool to receive the conduit or at a right angle to the body.

30 Claims, 16 Drawing Sheets

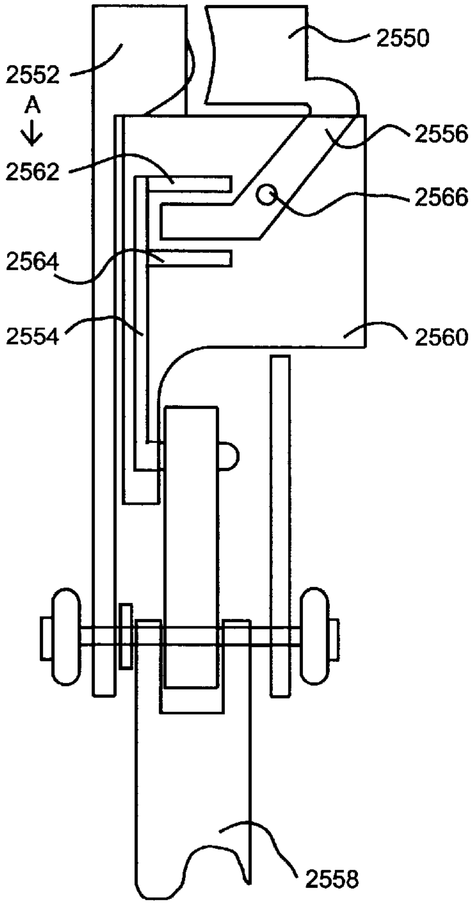
Figure 28
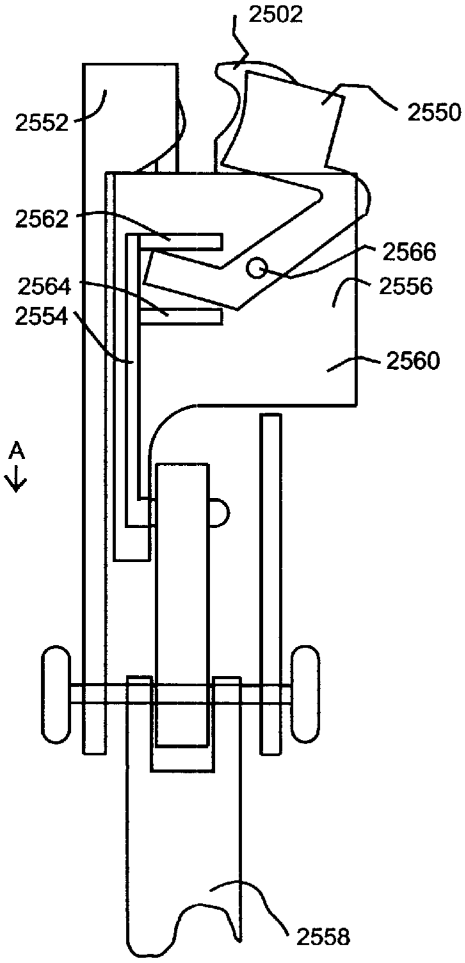
Fiqure 29

HAND TOOL FOR USE IN THE QUICK DISCONNECTION OF QUICK CONNECT/ DISCONNECT COUPLINGS

CROSS REFERENCE TO RELATED APPLICATIONS

The present application claims the benefits under 35 U.S.C. 119(e) of provisional patent application Ser. No. 60/136,050, filed May 26, 1999. This application incorporates by reference, as though recited in full, the disclosure of copending provisional application 60/163,050.

FIELD OF THE INVENTION

The invention relates to a hand tool, and more particularly, a hand tool for use in the quick disconnect of a quick connect/disconnect coupling.

BACKGROUND OF THE INVENTION

Quick connect/disconnect couplings are being commonly used to connect pipes and tubing in many areas from automobiles and trucks to gas lines. Although easy to connect, the disconnection requires that the release ring on the connector be recessed simultaneously with the removal of the conduit in the opposite direction. This can be a problem when the connectors are placed in inaccessible areas.

Although many devices have been patented for stripping the ends of electrical wires, such as U.S. Pat. No. 4,951,529, to Andre Laurencot; and U.S. Pat. No. 4,475,418 to Isamu Tani none have addressed the issue of removing a quick connector from a conduit.

The disclosed hand tool grasps and moves the conduit in the opposite direction from the release ring on the connector, easily removing the connector from the conduit.

SUMMARY OF THE INVENTION

A tool is disclosed for the removal of quick release couplings from a conduit. The tool has a body that is divided into a gripping portion a release portion, with the two portions being rotatably connected. In the manual embodiment, handles are connected to a second end of the body, one to the gripping portion and the second to the release portion. In the preferred embodiment, the second handle is non-movably secured to the release portion. A spring is affixed to the handles to maintain the handles at a maximum separation distance, which maintains the first end of the gripping and release portions adjacent one another. Compressing the handles causes the gripping element to compress and the gripping portion and the release portion to rotate around the connection, creating a distance between the gripping and said release element first ends. In alternative embodiments, the release and gripping portions can be incorporated with an air compressor, activated electrically, or through other convenient means. A gripping element is affixed to the gripping portion and has a receiving member and a clamping member. Together the receiving member and clamping member form a conduit retaining area. At least one of the receiving and clamping members are connected to a linkage that goes to the gripping portion handle. The release portion has a release element that has a first and a second plate. In the preferred embodiments, the lower, first plate is stationary, with the second plate movable. In some alternate embodiments, both the first and second plates are stationary. In the preferred embodiments, the second plate has a spring member that retains the second plate adjacent the first plate, thereby enabling a conduit to snap in and being maintained between the first and second plates. The can be a leaf spring placed between the second plate and the release portion or a spring recessed within, or through, the second plate and at least a portion of the release portion.

Preferably the clamping member has at least one arc, and in come embodiments, the receiving member is a mirror image of the clamping member. In the side access embodiments, an optional guide can be used adjacent the clamping member, to prevent the clamping member from moving side to side.

In one embodiment, the clamping member and release element open at the first end of the release and gripping portions to receive the conduit. Preferably the second plate is rotatably affixed to the release portion and the first plate is stationary to the release portion. The second plate is maintained adjacent to the first plate by a spring. The clamping member is connected to the linkage and rotates from an open position distanced from the receiving member when said handles are at a maximum distance to adjacent to the receiving member when said handles are compressed.

In another embodiment, the clamping member and release element open at a right angle to the first end of the body portion. Again, the second plate is rotatably affixed to the release portion and the first plate is stationary with the second plate being maintained adjacent to the first plate by a spring. The clamping member is connected to the linkage and moves from an open position distanced from the receiving member when the handles are at a maximum distance to adjacent to the receiving member when said handles are compressed. A guide is stationary to the gripping portion and adjacent to the clamping member to prevent side to side movement of the clamping member.

BRIEF DESCRIPTION OF THE DRAWINGS

The advantages of the instant disclosure will become more apparent when read with the specification and the drawings, wherein:

FIG. 28 is a side view of the opposing side of the embodiment of FIG. 27;

FIG. 29 is a side view of the hand tool of FIG. 29 in an open position;

DETAILED DESCRIPTION OF THE INVENTION

The disclosed hand tool is used to remove couplings from tubing, piping or other conduits. These quick connect/disconnect couplings are commercially used to connect tubing in all areas of industry, from air to chemicals. The structure, method of operation, and methods of connecting to various conduit materials, is well known in the art. The quick connect/disconnect coupling maintains the two conduits securely, and in fluid, and/or air, tight engagement with one another. The fluid can be a liquid such as water, oil, a combustion fuel such as gasoline, or a gas such as air, natural gas, propane, or the like. In the manual embodiment, the handle members are hand actuated and through a linkage, such as described in the U.S. Pat. Nos. 4,951,529, 4,475,418 and 2,523,936 patents, actuate the gripping and release members. The tool can be built on the framework of wire strippers, such as disclosed in U.S. Pat. Nos. 4,951,529, 4,475,418 or 2,523,936, the disclosures of each patent being incorporated herein by reference, as though recited in full.

Although these couplings are made for easy connection and removal, they require space to manipulate the coupling releases. This creates a problem when the couplings need to be replaced within tight spaces, such as on trucks, automobiles, AC units, etc. The disclosed device enables a user to reach into tight spaces, grip the tubing, and separate the coupling with a hand tool.

Figure 1:
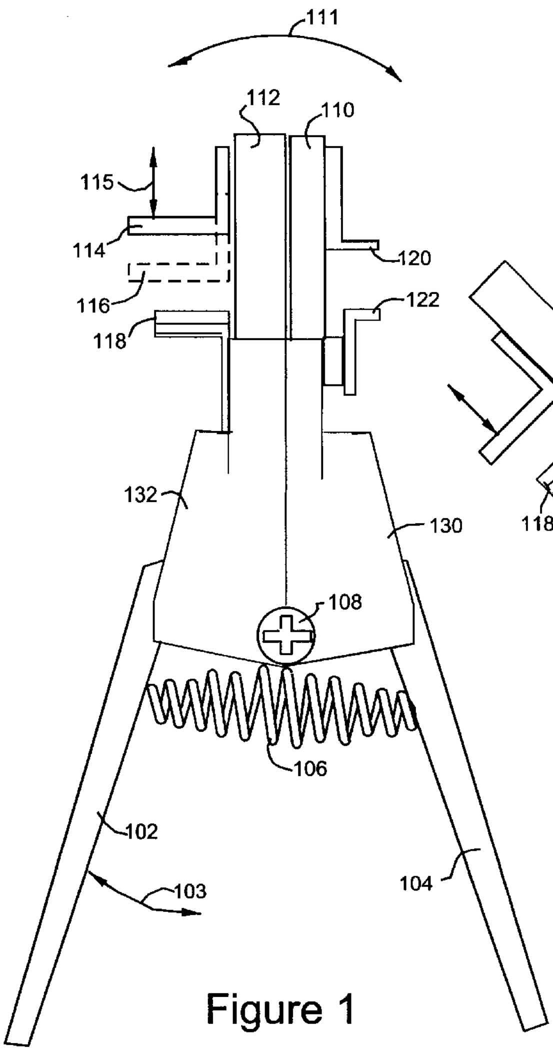
FIG. 1 is a side elevation view of a hand tool of the present invention.

FIG. 1 shows one embodiment of the hand tool of the present invention. The tool 100 includes a pair of handles 102 and 104 that are movable relative to each other, as indicated by the arrow 103. The handles 102 and 104 are biased by the spring 106, maintaining them in the spread a part position during non-use.

Figure 2:
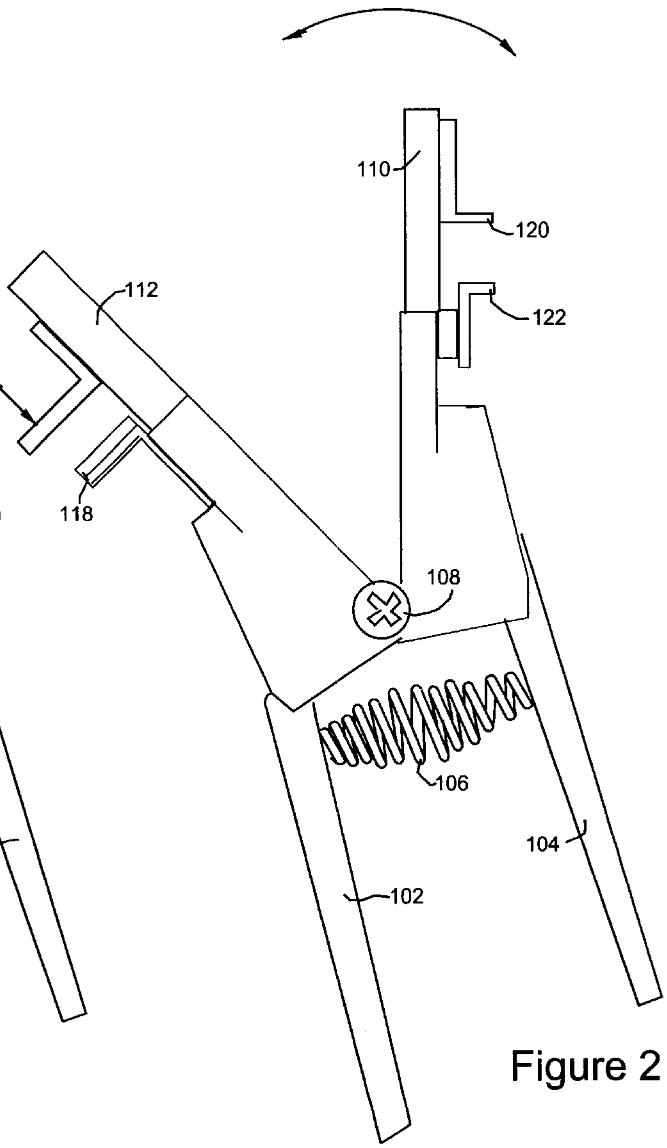
FIG. 2 is a side elevational view of the hand tool of FIG. 1, showing the tool with the handles pressed together and the gripping units spread apart.

The upper section of the tool 100 is divided into a gripping portion 112 and a separating portion 110 that form the upper portion of the frame elements 132 and 130. The frame elements 132 and 130 are maintained in a rotational relationship with one another through the use of a pivot, or hinge, 108, as shown in FIG. 2.

The gripping portion 112 includes a pair of gripping jaws; upper jaw 114 and lower jaw 118. In this embodiment, the lower jaw 118 remains stationary, while the upper jaw 114 moves toward the lower jaw 118, in the direction indicated by arrow 115, to grip the tube. The movement of the upper jaw 114 to the lower, or gripping, position is shown in phantom as 116. The movement of the upper jaw 114 must be sufficient to close the space between the jaws 114 and 118 an amount required to securely retain the conduit without creating damage.

The separating portion 110 carries the upper conduit jaw 120 and lower conduit jaws 122. As illustrated in FIG. 2, the movement is between the upper jaw 114 and the lower jaw 118, while the two conduit jaws 120 and 122 remain stationary. In the illustrated embodiment, the handle 104 is fixed to the frame element 130 and remains stationary while the handle 102 moves to pull the upper jaw 114 toward the lower jaw 118, although both handles could move to separate the frame elements 130 and 132. As the handles 102 and 104 are compressed against the resistive force of the compression spring 106, the frame elements 130 and 132 are separated, moving the gripping portion 112 and separating portion 110 away from one another as indicated by the arrow 111.

Figure 3:
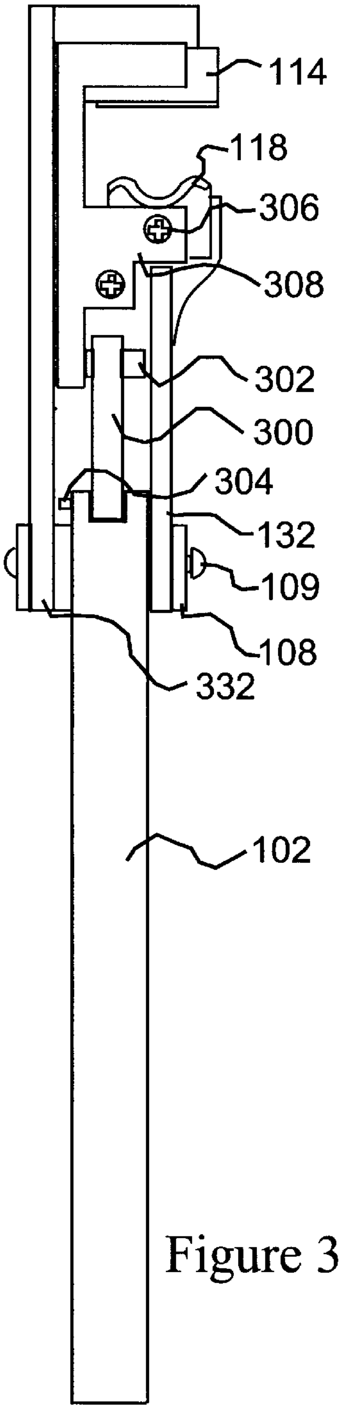
FIG. 3 is an end elevational view of the hand tool of FIG. 1.
Figure 4:
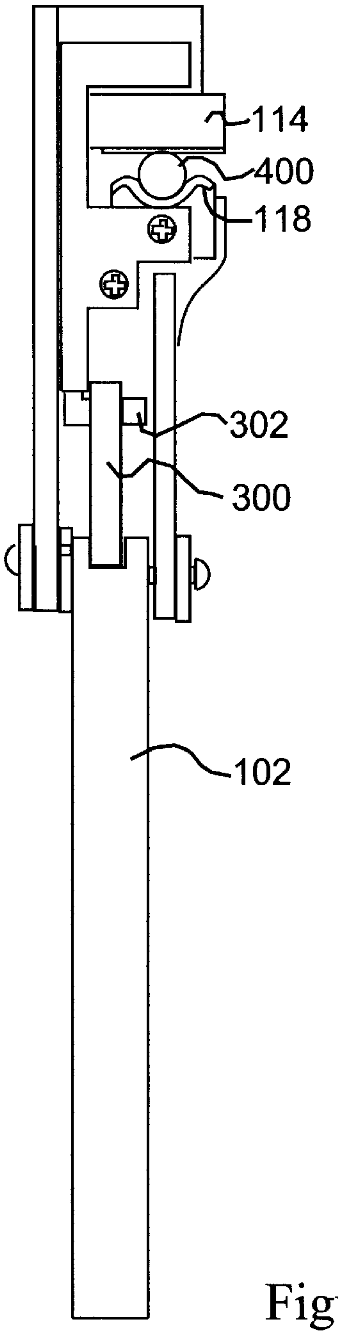
FIG. 4 is an end view of the opposite end of the hand tool of FIG. 3.

FIG. 3 shows the upper gripping jaw 114 spaced from the lower grippingjaw 118 in an open position. The lower gripping jaw 118 can be curved to accommodate the shape of a typical conduit, thereby rendering the system more capable of accommodating a range of conduit diameters. It should be understood that both the upper and lower jaws can be curved or, although less desirable, would be the use of two non-curved surfaces. The lower jaw 118 is fixed in place by a screw 306, or other convenient mechanism, such as a bolt, welding, or the like. Alternatively, the lower jaw can be molded as part of the tool. It is critical that there be relative movement between the upper and lower gripping jaws, to enable the tool to clamp onto the conduit 400, as shown in FIG. 4. It is not, however, narrowly critical whether one or both jaws move, or whether it is the upper or lower jaw that is movable. The movement of either or both jaws can be achieved in any of the methods well known in the art.

FIG. 3 also illustrates the link member 300 that engages the handle 102 by means of a pin 304. The link member 300, in turn, engages the jaw-supporting member 308, by means of a pin 302. This embodiment illustrates one method of transferring the action created by the squeezing of the handles to the gripping of the jaws and other movement transfer mechanisms can be used. The handle 102 is affixed to the frame element 132 and rear frame 332 by means of a pin or screw 109 and a well know shaft type of structure, not shown. The frame element 132 and rear frame 332 are each formed from a single piece of metal or other rigid material, and maintained parallel to one another through use of pin 109 or other means known in the art.

Figure 5:
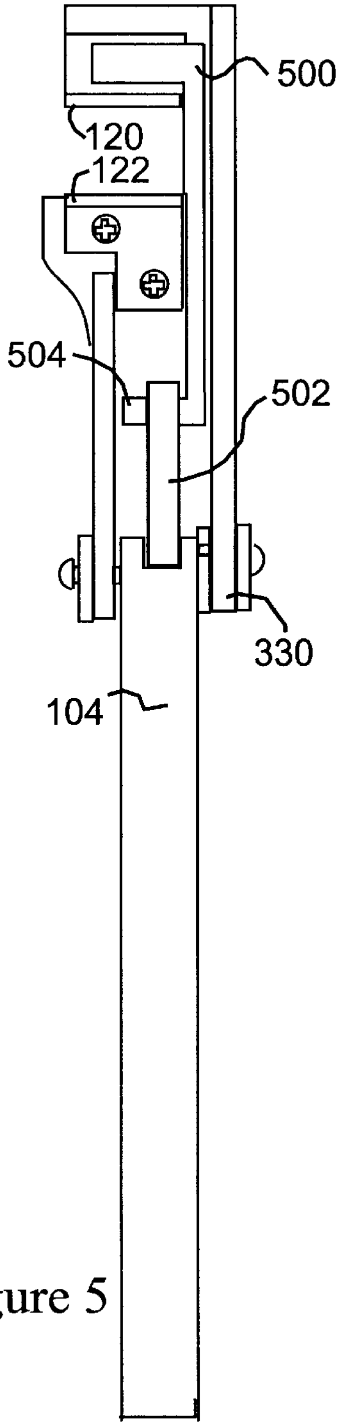
FIG. 5 is the end view of FIG. 3, illustrating a conduit being gripped by the tool.

FIG. 5 shows the handle tool from the opposite side from that illustrated in FIG. 3. The upper and lower conduit jaws 120 and 122 need not be moveable, but merely need to be spaced apart a distance sufficient to accommodate the range of diameters of the quick connect coupling. In those instances where the conduit jaws 120 and 122 are not moveable, the handle 104 can be rigidly fixed to the frame elements 130 and 330. A linkage assembly including the link 502 and the pin portion 504 of the linkage element 500 can be used to provide movement of the upper conduit jaw 120 relative to the lower conduit jaw 122.

The use of movable conduit jaws 120 and 122 provides an ability to accommodate a greater range of coupling diameters than is practical with a fixed jaw system. Unlike the pair of jaws 114 and 118, the conduit jaws 120 and 122 do not clamp to a component of the coupling system. One or both jaws need merely engage a surface of the coupling as will become more evident, hereinafter.

Figure 6:
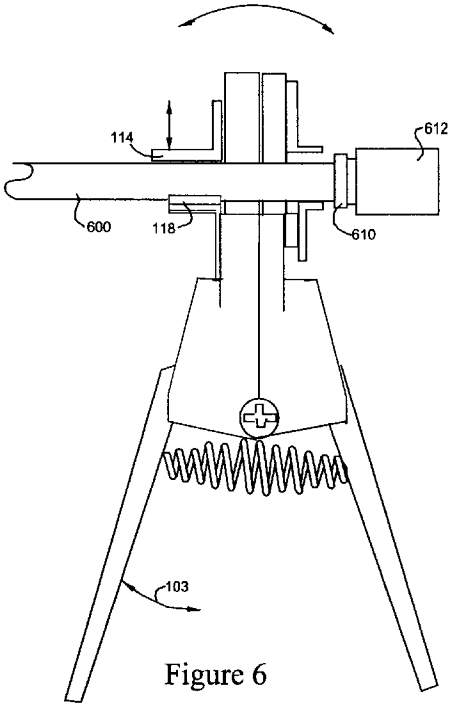
FIG. 6 is the side elevation view corresponding to FIG. 5.
Figure 7:
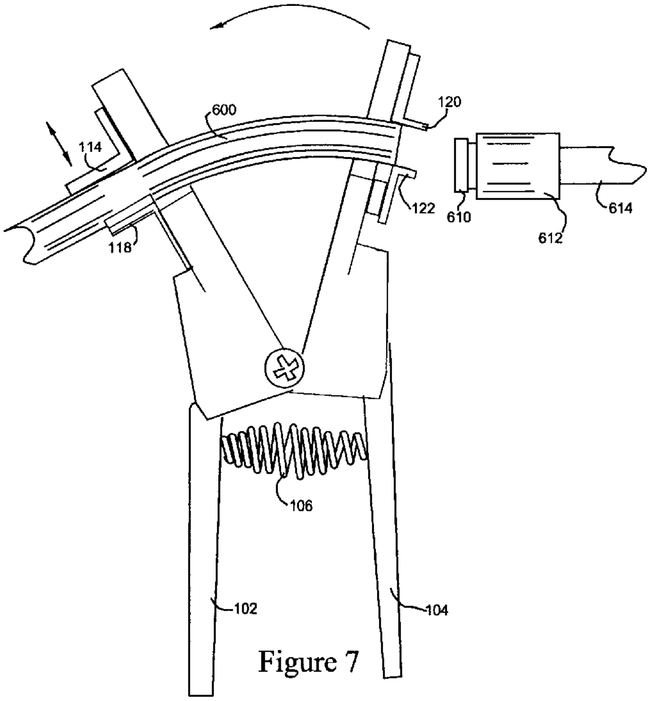
FIG. 7 corresponds to FIG. 6, and shows the tool with the handles pressed together and the disconnecting of the quick disconnect/connect coupling.

FIGS. 6 and 7 correspond to FIGS. 1 and 2, and illustrate the hand tool 100 used to disconnect a quick connect/disconnect coupling 612 by separating the conduit 600 from the conduit length 614. The quick connect coupling 612 is of any configuration as well know in the art, and in particular is of the design in which the disconnect element 610 must be brought toward the body section of the coupling 612. When the coupling disconnect element 610 is forced toward and into the coupling body 612, the conduit length 600 is released and is free to separate from the quick disconnect coupling 612. An edge of the conduit jaw 120 and/or an edge of the conduit jaw 122 is placed to lie adjacent the distal surface of the disconnect element 610. The clamping of the hand tool 100 onto the conduit length 600 is achieved by squeezing together the handles 102 and 104 and bringing the upper and lower jaws 114 and 118 together. While the tool is clamped to the conduit length 600, the jaws 120 and 122 press against the distal surface of the quick release element 610, forcing the element 610 into the coupling 612. This movement disengages the conduit 600 from the coupling 612 and forces the coupling 612 to separate from the conduit length 600.

Figure 8:
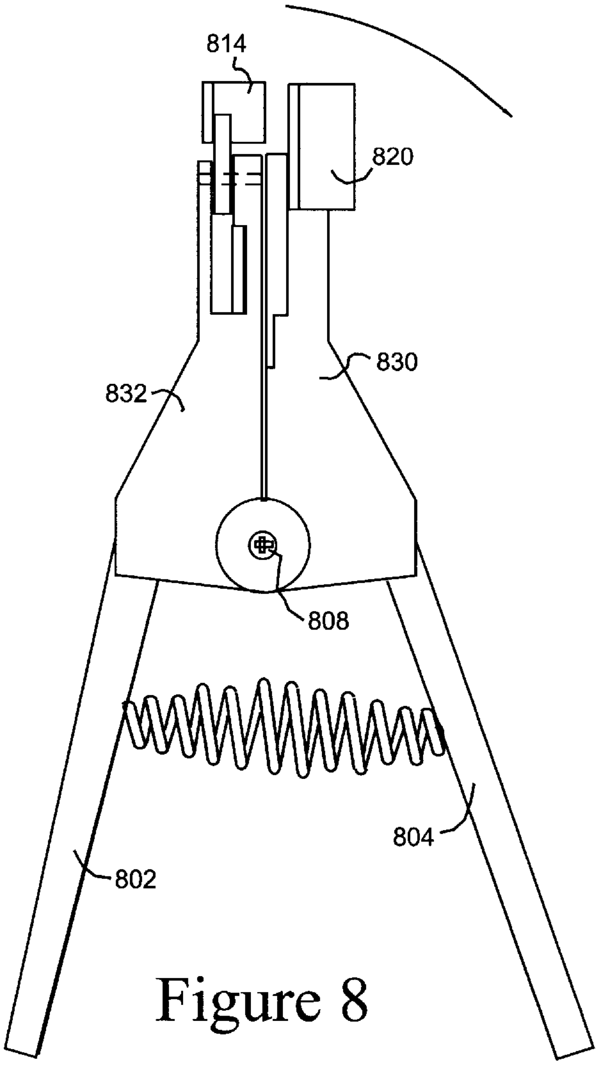
FIG. 8 is a side elevational view of another embodiment of a hand tool of the present invention.
Figure 9:
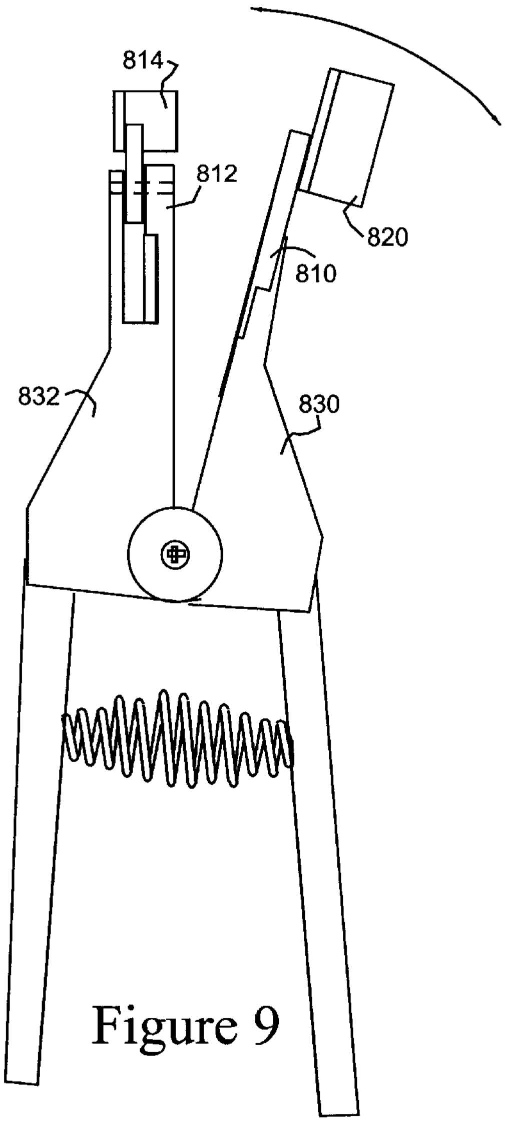
FIG. 9 is a side elevational view of the hand tool of FIG. 8, with the handles pressed together.

FIGS. 8 and 9 illustrate an alternative embodiment of the hand tool, indicated generally as 800. Whereas in the embodiments of FIGS. 1 through 7, the conduit access is from the side of the hand tool 100, in the embodiment of FIGS. 8 and 9, the conduit access is from above the hand tool 800. The operation of the tool 800 is essentially the same as that of the hand tool 100. The handles 802 and 804 are squeezed together against the resistive force of the spring thereby causing the frame section 832 and 830 to pivot apart, as indicated by arrow 801, pivoting the conduit jaw 820 away from the clamping jaw 814. The clamping jaw 814 is carried by the upper frame section 812 and the conduit jaw 820 is carried by the upper frame element 810. As noted heretofore, one or both of the clamping jaws 814 or 815 (FIG. 14) can move in order to firmly grip the conduit. The conduit jaw 820, as illustrated herein is a V-shape with unmovable legs 822 and 824. The conduit is placed into the V until sufficiently snug to prevent the conduit from slipping. The conduit jaws illustrated in FIGS. 16 and 17 can also be incorporated into this design. As previously noted, the non-clamping jaw or jaws can be stationary, and the handle 804 can in such case, be fixed relative to the frame element 830.

FIGS. 10 through 13 show the operation of the jaw components of the hand tool, relative to the conduit and quick disconnect/connect coupling. The operation is equally representative of the side jaws of FIGS. 1 and 2 and the top opening jaws of the embodiment of FIGS. 8 and 9.

Figure 10:
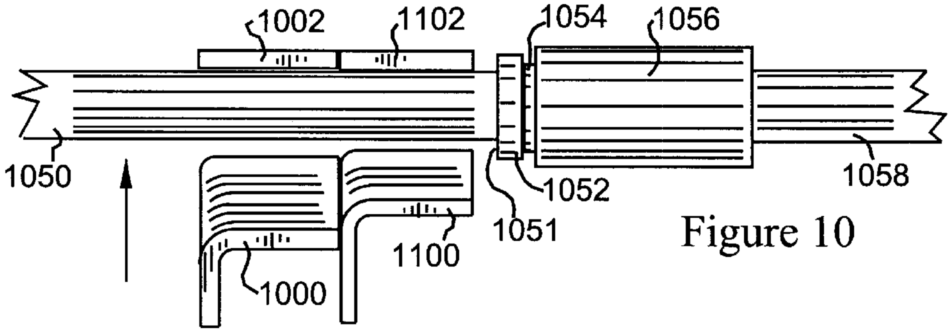
FIG. 10 is a fragmental illustration of a hand tool of the present invention, with the conduit and coupling being positioned relative to the hand tool.

As seen in FIG. 10, the clamping jaws 1000 and 1002 are initially proximate the coupling engaging jaws 1100 and 1102. The conduit length 1050 is brought into position between the clamping jaws 1000 and 1002 and coupling engaging jaws 1100 and 1102. The coupling engaging jaws 1100 and 1102 are positioned proximate, or in contact with, the distal surface 1051 of the quick disconnect element of the coupling 1056. The conduit length 1058 is secured to the coupling body 1056 by means known in the art.

Figure 11:
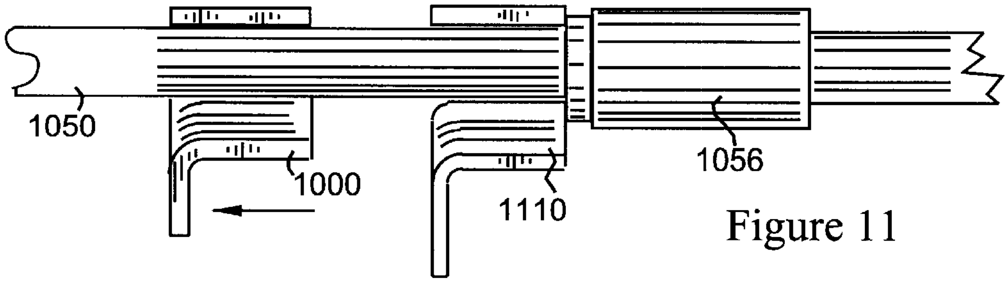
FIG. 11 is a fragmental illustration of a hand tool of the present invention, showing the conduit being clamped by the hand tool and the disconnect element of the coupling being forced into the coupling.
Figure 12:
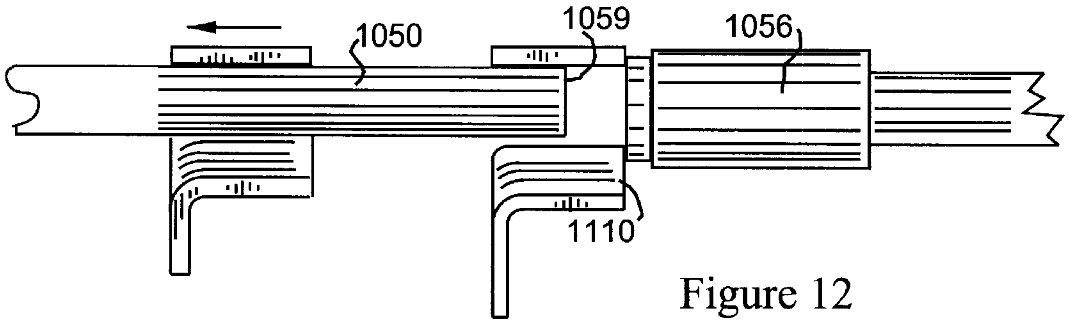
FIG. 12 is a fragmental illustration of the disclosed hand tool clamping the conduit and the disconnect element of the coupling being forced into the coupling, and the conduit released from the coupling.
Figure 13:
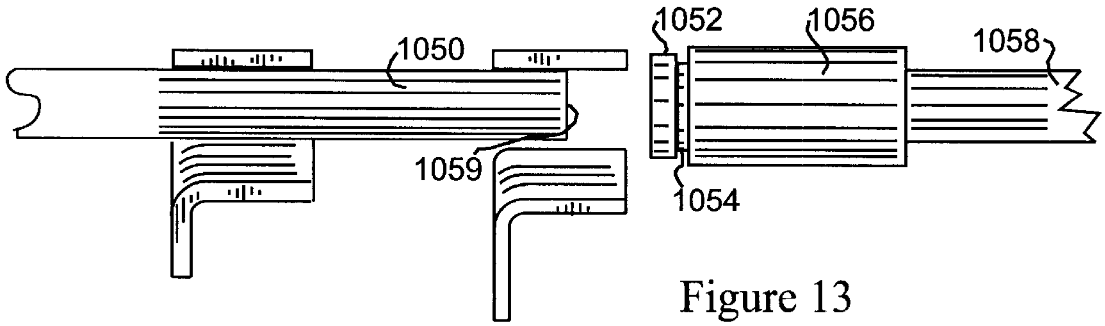
FIG. 13 is a fragmental illustration of the hand tool with coupling being driven away from the conduit.

In FIGS. 11, 12 and 13 the pair of jaws 1000 and 1002 are brought into clamping engagement with the conduit 1050 and moved, or pivoted away from the coupling engaging jaws 1100 and 1102. The narrow portion 1054 of the coupling is recessed into the body of the coupling 1056 to release the conduit 1050. The relative movement of the two pairs of jaws is along the axis of the conduit length 1050 and 1056.

As illustrated in FIG. 12, the end 1059 of the conduit length 1050 is withdrawn from within the quick connect/disconnect coupling 1056. In FIG. 13, the quick disconnect/connect coupling 1056 and conduit length 1058 fall away from the conduit length 1050.

Figure 14:
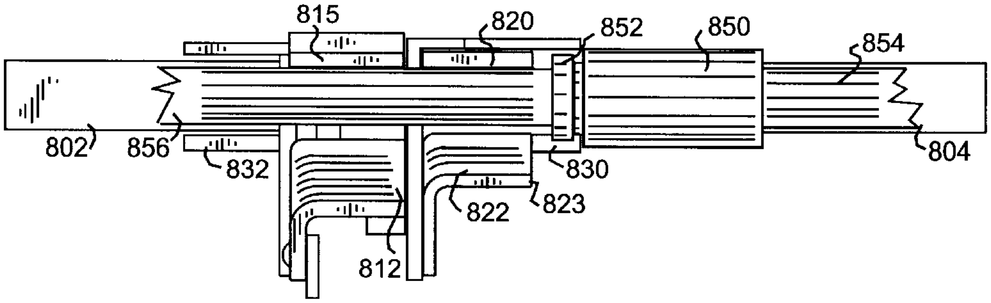
FIG. 14 is a fragmentary illustration corresponding to the hand tool of FIG. 8, showing the conduit and coupling being positioned relative to the hand tool.
Figure 15:
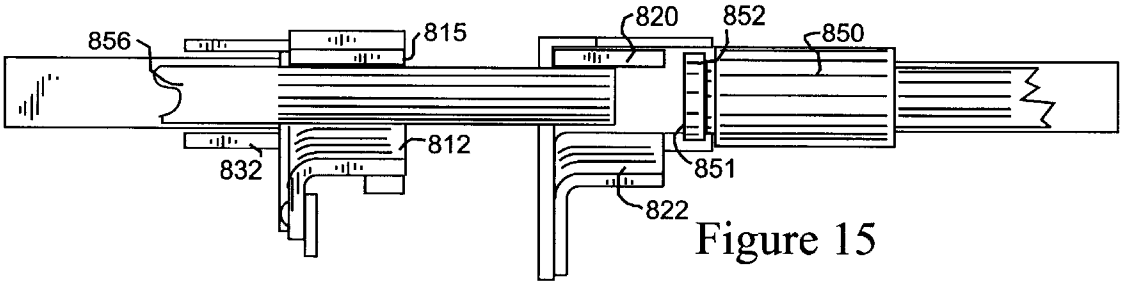
FIG. 15 is a fragmentary illustration corresponding to the hand tool of FIG. 14, showing the conduit being clamped by the hand tool and the coupling being driven away from the conduit.

FIGS. 14 and 15 illustrate the operation of the top access modification of FIGS. 8 and 9. As seen in FIG. 14, the conduit length 856 is positioned between the clamping jaws 812 and 815. The coupling engaging jaws 820 and 822 are positioned proximate the quick disconnect element 852 of the coupling 850. The quick connect/disconnect coupling 850 holds the conduit length 854 securely and in fluid tight engagement with the conduit length 856. As illustrated in FIG. 15, the two pairs of jaws are moved apart along the axial line of the conduit length 856. The distal edge 823 of the jaw 822 engages the distal surface 851 of the quick release element 852 forcing the quick release element into its disconnect position. The conduit length 856 is thus removed from its position in locked engagement within the quick disconnect/connect coupling 850 and the two conduit lengths 856 and 854 are totally separated from each other.

Figure 17:
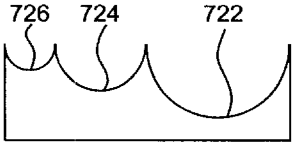
FIG. 17 is an end view of one half of a jaw for gripping the conduits.
Figure 16:
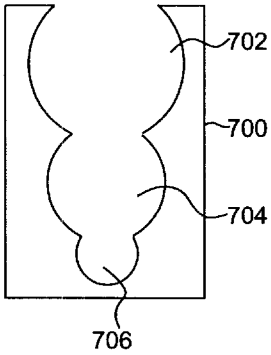
FIG. 16 is an end view of an alternate jaw unit for gripping the conduits.

In FIGS. 16 and 17 alternate embodiments of the conduit gripping jaw are illustrated. In FIG. 16, the jaw unit 700 has three vertically placed conduit receiving areas 702, 704 and 706, having decreasing circumferences. This enables the jaw unit 700 to accommodate several sizes of conduits. It should be noted that this embodiment lends itself to easy removal from the tool for replacement with a jaw unit having different circumferences. Any of the conduit jaws can be removably affixed to the device to enable more diversified use of the tool through the use of jaws have varied sizes and shapes. In FIG. 17, the size variation is accomplished through use of horizontally placed arcs 722, 724 and 726. Although only the lower jaw 720 is illustrated here, it is preferable, although not critical, that the upper jaw be a complimentary configuration.

Figure 18:
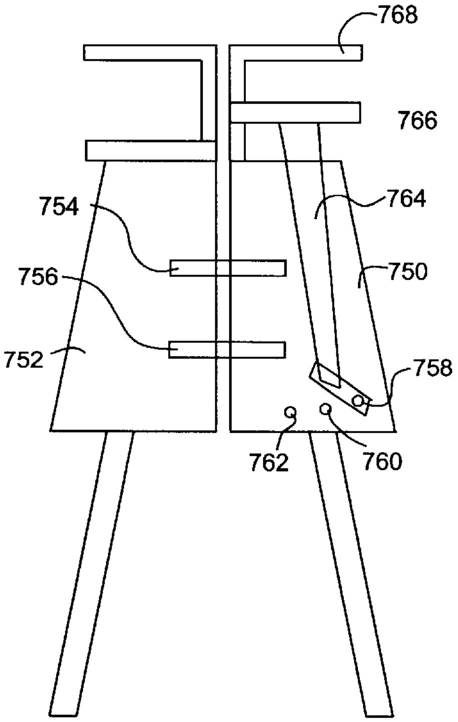
FIG. 18 is a side view of an alternate hand tool embodiment having an adjustable conduit grip.

In FIG. 18 an alternate embodiment is illustrated wherein the support body, divided into two approximate halves, slide in relationship to one another. The gripping support 752 and conduit support 750 are provided with slide bars 754 and 756 that enable a lateral movement rather than a pivoting action as described heretofore. The conduit support 750 uses an adjustable lower jaw 766 to accommodate the different connector sizes. The lower jaw 766 is connected to an adjustment bar 764 that is, in turn, connected to adjustment pins 758, 760 and 762. As the bar 764 is moved from pin 758 to pin 760, the lower jaw 766 is separate further from the upper jaw 768.

Figure 19:
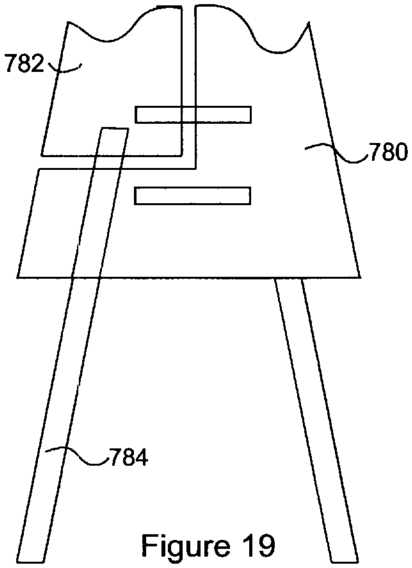
FIG. 19 is a side view of the body of an alternate hand tool embodiment.

In FIG. 19, the gripping body 782 is a substantially smaller unit than the conduit body 780. Rather that being divided into halves, as illustrated in FIG. 18, only a portion of the total surface area forms the gripping body 782. The handle 784 is movably supported within the conduit body 780, extending into the gripping body 782 where it is affixed in a manner to enable the sliding action between the two units. The gripping jaws and conduit jaws are not illustrated in this embodiment and can be of any configuration and/or combination.

Figure 20:
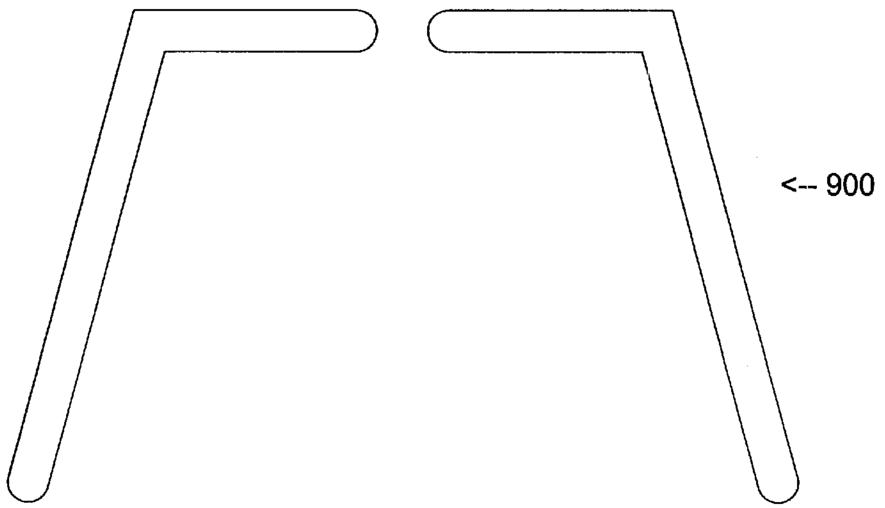
FIG. 20 is a front view of handles for use with the disclosed hand tool.
Figure 21:
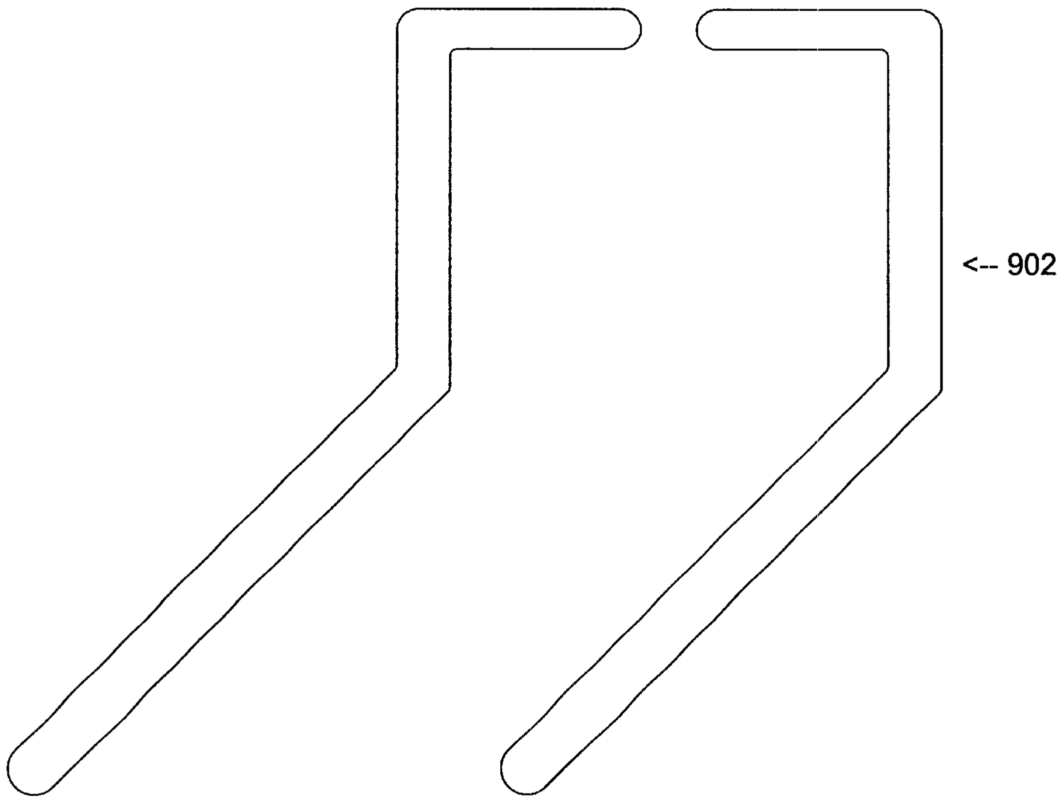
FIG. 21 is a perspective view of angled handles for use with the disclosed invention.
Figure 22:
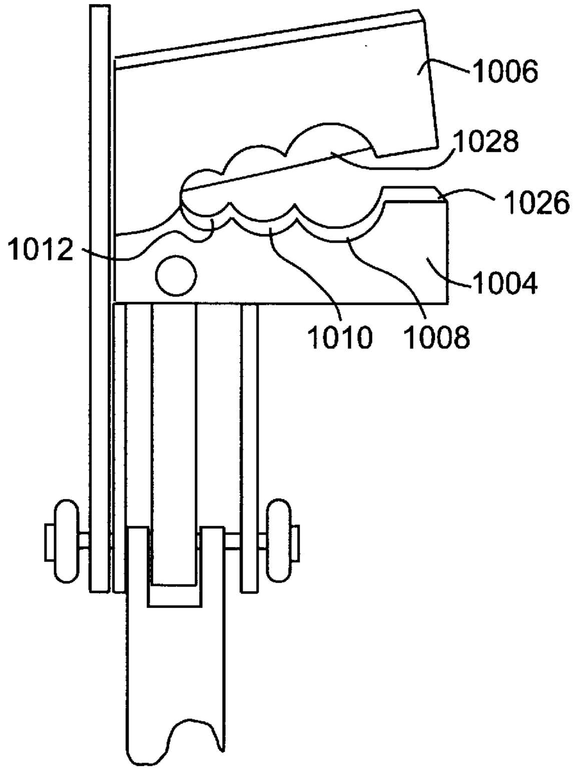
FIG. 22 is a side view of an embodiment of the disclosed hand tool having a multi-arced gripping head in an open position.
Figure 23:
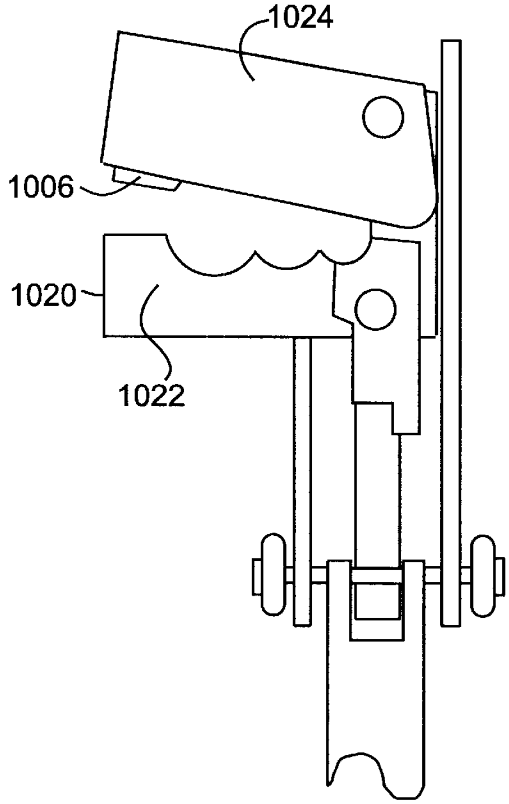
FIG. 23 is a side view of the opposite side of the embodiment of FIG. 22.

In FIGS. 20 and 21 two handle configurations are illustrated. In FIG. 20, the handles 900 are straight handles as illustrated heretofore. In FIG. 21, the handles 902 are angled to enable the user to reach into tighter spaces. The handles illustrated in these figures are examples only and other configurations, as will be evident to those skilled in the art, can be incorporated with the disclosed device.

In FIGS. 22–25, the hand tool 1000 contains multiple arcs dimensioned to accommodate multiple conduit diameters. For ease of description, the two sides of the hand tool 1000 will be referred to as the conduit gripping portion 1002, illustrated in FIG. 22 and the coupling release portion 1020, illustrated in FIG. 23. The conduit gripping portion 1002 comprises a pair of multi-arced members, lower member 1004 and upper member 1006. In the illustrated embodiment, each of the members 1004 and 1006 contain mirror image arcs 1008, 1010 and 1012 in three different sizes. It should be noted, however, that the number and dimensioning of the arcs is dependent upon the size of the upper member 1004 and lower member 1006 as well as the circumference of the conduits to be accommodated. When in the non-use position the upper member 1005 and the lower member 1004 are separated a distance slightly greater than diameter of the largest conduit for which the unit was dimensioned. The upper guide 1028 is positioned adjacent the sliding upper member 1006 and servers to prevent the movable upper member 1006 from wandering or twisting. The guide 1028 is immovably secured to the frame 1030 and must permit non-binding movement of the upper member 1006. The use of a guide in this, and other embodiments, is optional and will depend upon end use and manufacturing decisions. Instances where the guide is beneficial, such as with larger diameter conduits, etc., will be obvious to those skilled in the art. In the non-use position, the coupling release portion 1020, illustrated in FIG. 23, the lower release member 1022 is preferably arced in the same manner as the lower member 1006. The upper release member 1024, as illustrated, is not arced and it is not necessary to match the arcs on the bottom release member 1022 for the hand tool 1000 to work, however the upper release member 1024 can be arced if so desired.

Figure 24:
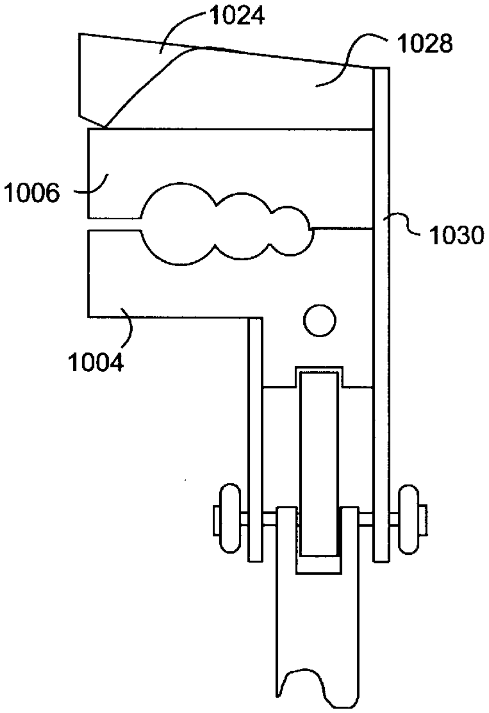
FIG. 24 is a side view of the embodiment of FIG. 23 in a closed position.
Figure 25:
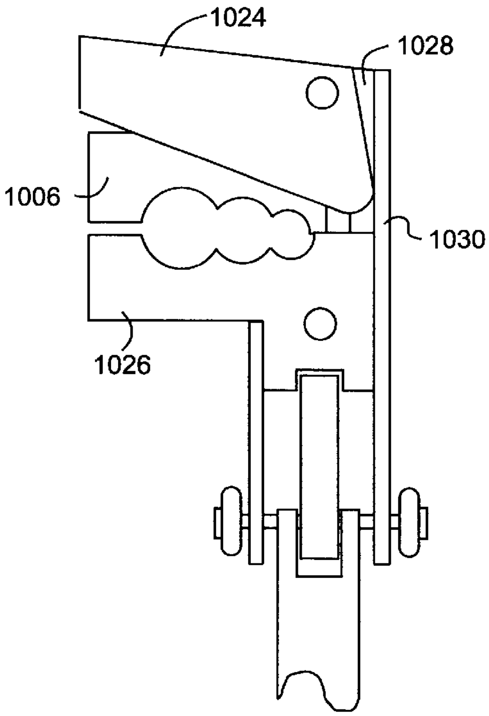
FIG. 25 is a side view of FIG. 24 in a closed position.

In FIGS. 24 and 25 the hand tool 1000 is in a second position with the handles having been partially squeezed and the conduit gripped. In the second position the upper member 1006 and the lower member 1004 are brought together to grip the conduit while the upper release member 1024 remains in the original position. Continued pressure on the handles brings the upper release member 1024 into contact with the conduit. It should be noted that the conduit must be able to slide between the upper release member 1024 and the lower release member 1022. Therefore the construction of the release portion 1020 must be such that the upper release member 1024 is distanced a sufficient amount from the lower release member 1022 to enable movement along the length of the conduit while still contacting the coupling to force release. As the hand tool goes from the second to the third position, as the handles are compressed to their maximum, the release member 1020 pushes against the coupling, as noted heretofore, thereby removing the coupling from the conduit.

Figure 26:
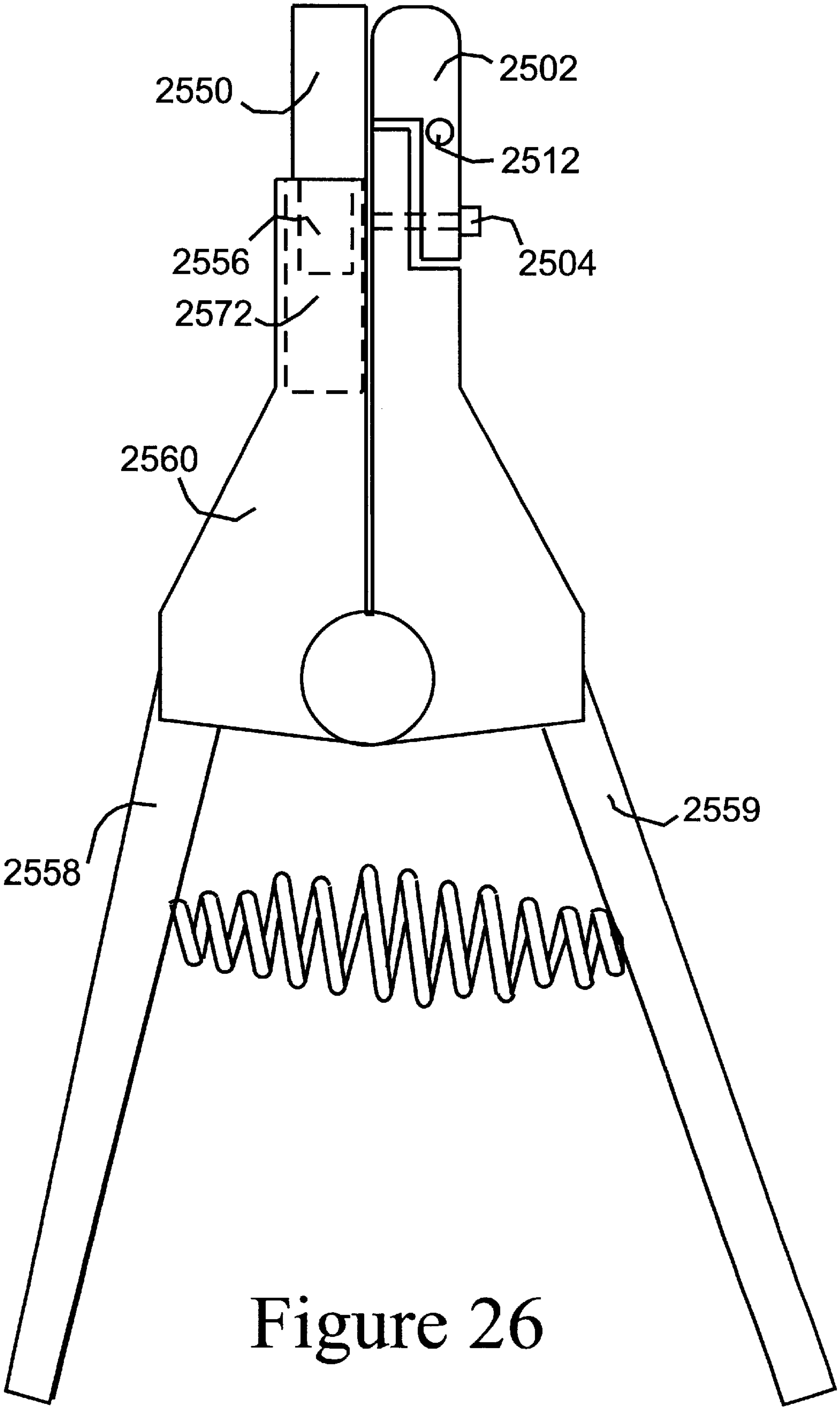
FIG. 26 is a front view of the embodiment of FIG. 27.
Figure 27:
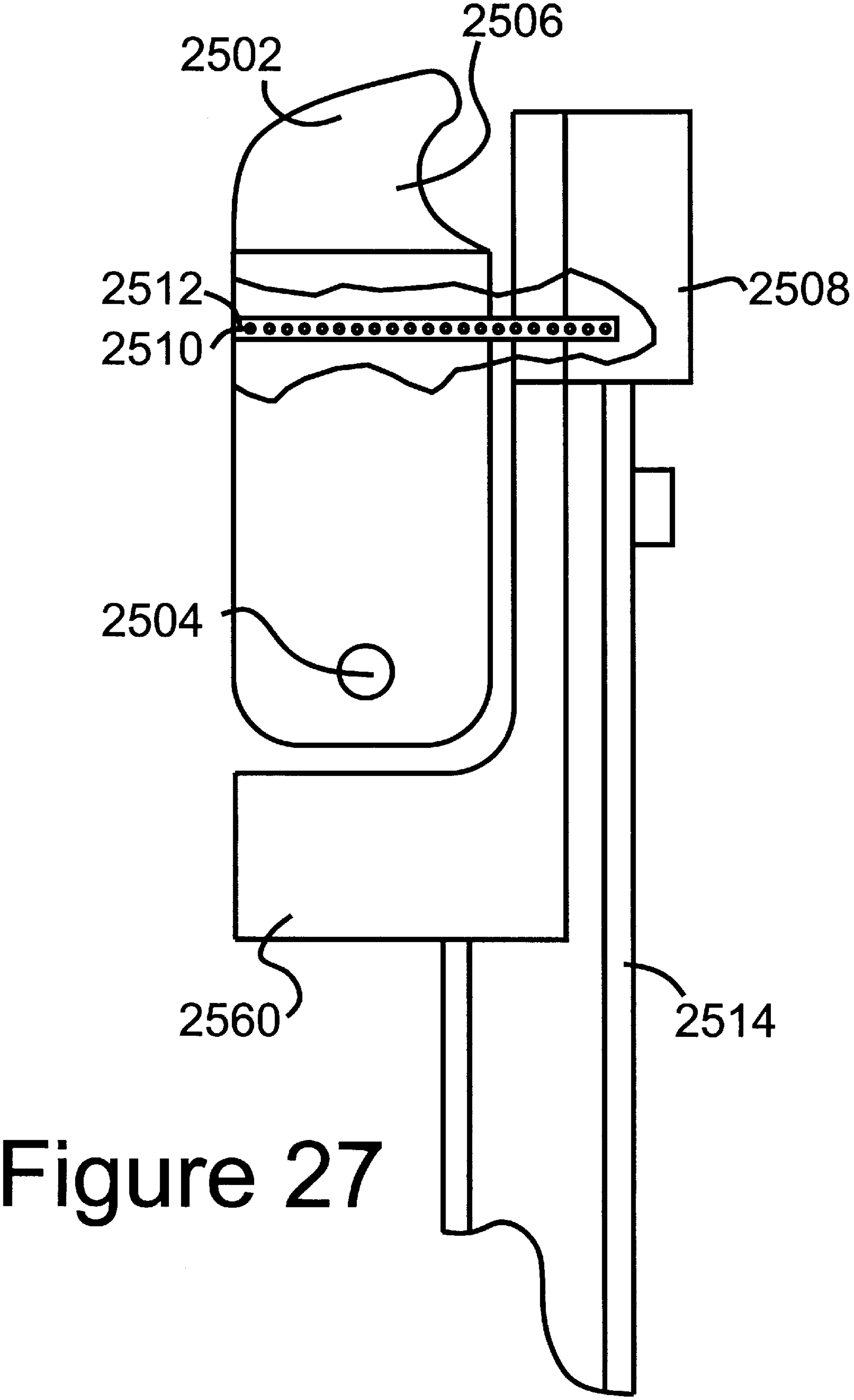
FIG. 27 is a side view of the preferred embodiment of the disclosed hand tool having a top access.

FIGS. 26 through 29 illustrate an alternate embodiment of the hand tool. The hand tool 2500 is designed to grip a conduit when there is little available space on either side of the conduit, as the gripping mechanism is located at the top of the hand tool 2500. FIG. 26 illustrates the front view of the tool 2500 in a non-use position. The release element handle 2559, in this as well as other illustrated embodiments, is preferably secured in a non-movable position relative to the body 2560 to provide a more effective release action as the gripping member handle 2558 and release element handle 2559 are compressed. The gripping member handle 2558 is, again in all embodiments, movable in order to create the clamping action of the gripping members. In the event the clamping and releasing elements described in this, and other disclosed embodiments, are incorporated in an air tool, are electrically operated, or receive other methods of activation, the handles would be reconfigured to coordinate the appropriate power source and the clamping and releasing action achieved from the alternate power source. The spring loaded release element 2502 is illustrated in a side view that clearly illustrates how the release element 2502 rotates around the pivot 2504. The spring 2510 in this embodiment is placed within a channel 2512 that has been drilled through the release element 2502, the release plate 2508. The spring 2510 is secured at its ends through use of a bolt, welding, or other methods, or combination of methods. Other methods of providing spring action to the release element 2502 can be used, such as a leaf spring between the release element and the body, springs recessed along the outer surface of the release element, etc. and will be evident to those skilled in the art. The release element 2502 has a receiving arc 2506 to receive the conduit, thereby placing the conduit between the receiving arc 2506 and the release plate 2508. The pressure exerted by the spring 2510 maintains the release element 2502 in the vertical position so that once the conduit is placed within the receiving arc 2506, the release element 2502 is returned as close as possible to its original position with sufficient force that it is able to disconnect the coupling as described heretofore. The pressure applied by the spring 2510 permits a single size arc to remove a variety of coupling sizes, as the coupling release is slightly larger than the diameter of the conduit. The curved top portion of the release element 2502 is beneficial to enable the conduit to easily slide between the release element 2502 and the release plate 2508. Alternatively a release button, or other means, can be used to facilitate the release element 2502 moving away from the release plate 2508 to permit entry of the conduit into the receiving arc 2506. It should be noted that although the preferred embodiments, as illustrated, show an arc, the release element will also grip the conduit using a flat surface.

Figure 30:
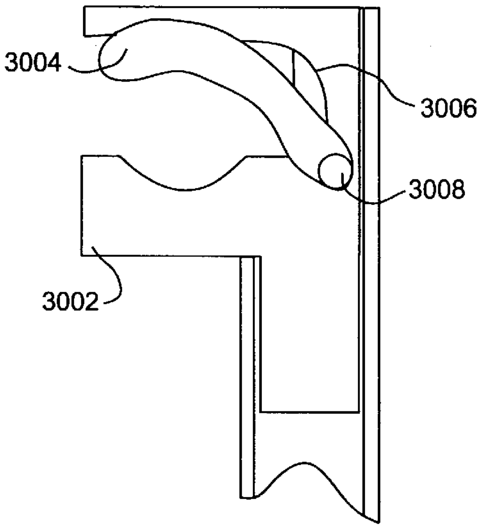
FIG. 30 is a side view of an alternate embodiment of the disclosed hand tool having side access.

FIGS. 29 and 30 illustrate the conduit gripping head 2550 and the conduit support plate 2552. The conduit gripping head 2550 has a leg 2556 that is contained within the body 2560 of the tool 2500. In the illustrated embodiment, the leg 2556 is prevented from twisting or buckling by being maintained in a channel 2572 (FIG. 26). The leg 2556 is prevented from removal from the channel 2572 by a pivot 2566 that enables the conduit gripping head 2550 to rotate. The angle between the gripping head 2550 and the leg 2556 determines the amount of movement of the head 2550 when the handles 2558 and 2559 are compressed. The smaller the angle the shorter the distance between the closed and opened positions. The leg 2556 interacts with the arm 2554 to open and close the gripping head 2550 in response to gripping pressure on the handles 2558. The arm 2554 in this embodiment has a pair of flanges 2562 and 2564 that move the leg 2556. Alternative methods, however, such as a rivet, bolt, etc, and will be obvious to those skilled in the art.

When the handles 2558 are in the open position, the flanges 2562 and 2564 are in the uppermost position and the head 2550 is pulled back into the conduit receiving position illustrated in FIG. 29. Once the handles are squeezed together, the arm 2554 is moved in the direction of arrow A, pulling the flanges 2562 and 2564 in a downward motion and moving the head 2550 into contact with the conduit support plate 2552 gripping the conduit between the head 2550 and the support plate 2552. Preferably the contact plate 2552 is slightly curved, however this is not critical to the gripping of the conduit and the plate 2552 can also have a flat surface.

Figure 31:
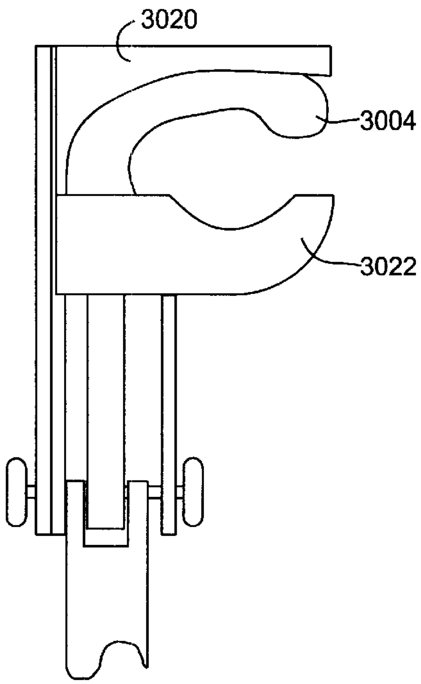
FIG. 31 is a side view of the opposing side of the hand tool of FIG. 30.
Figure 32:
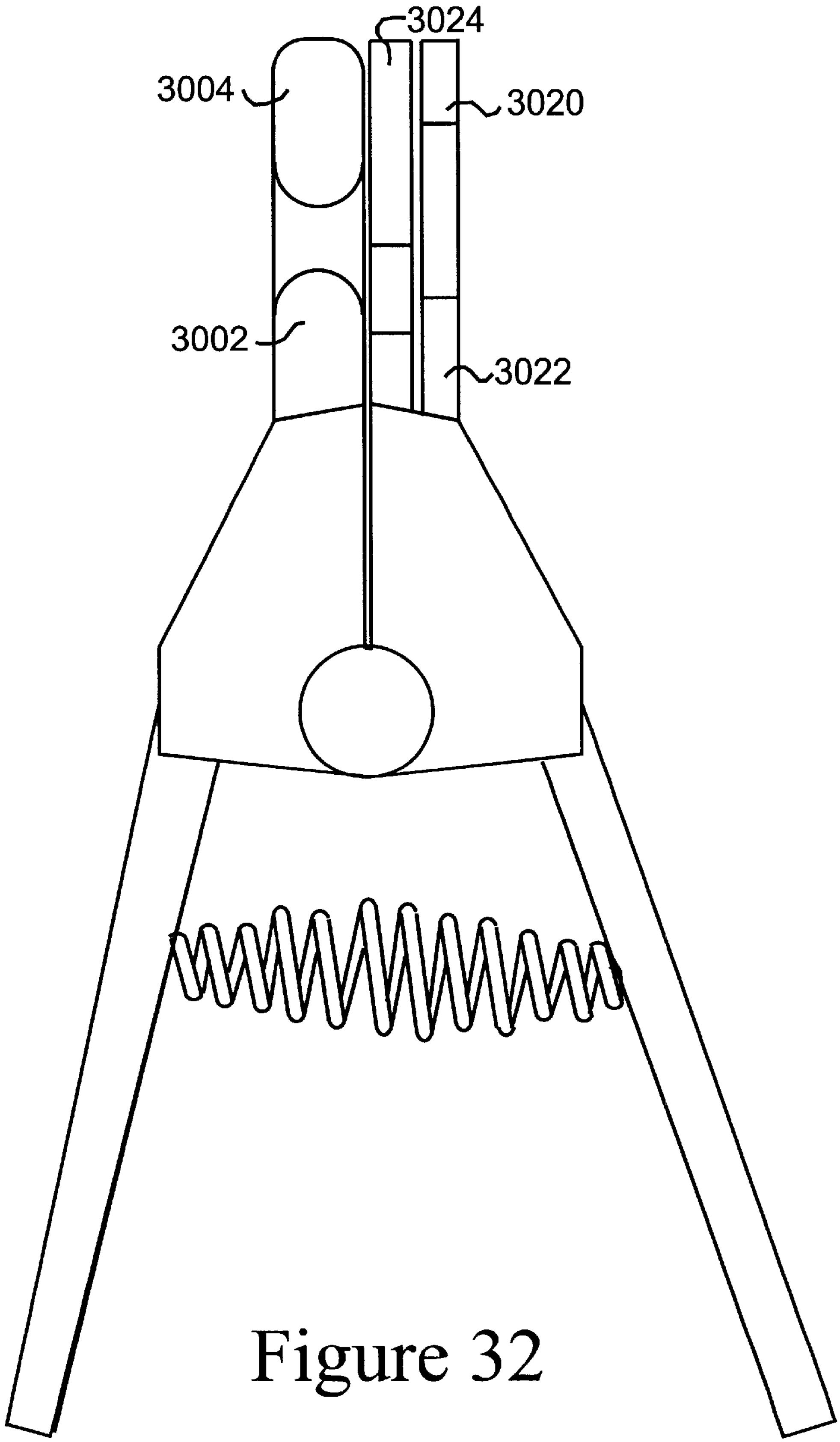
FIG. 32 is a front view of the hand tool of FIG. 30.

In FIGS. 30–32 a horizontal, spring loaded gripping head design is illustrated in the hand tool 3000. In FIG. 30, the conduit lower jaw 3002 and upper jaw 3004 are curved to receive the conduit, and, with the addition of the spring 3006 the upper jaw 3004 and lower jaw 3002 are able to accommodate a variety of conduit sizes using a single arc. The spring 3006 has sufficient force to maintain the upper release member 3004 adjacent the conduit, holding a large range of conduit diameters between the stationary lower release unit 3002 and the spring loaded upper release unit 3004. Although the multi arced jaws as illustrated heretofore can also be employed, it is not necessary when a spring is incorporated into the hand tool. In this embodiment, the upper release member 3004 is rotated around a pivot point 3008 while the lower release member 3002 remains stationary. As seen in FIG. 31, the upper gripping member 3020 interacts with the lower gripping member 3022 to securely hold the conduit while the coupling is removed. This embodiment also employs a guide 3024 to prevent the upper gripping member 3020 from twisting. A leaf spring 3006 is illustrated herein, however a similar type spring, or an embedded spring, as illustrated in FIG. 33, can also be used to maintain the upper release member 3004 in the closed, or semi closed position.

It should be noted that although several of the embodiments illustrated herein have the lower members stationary, either one, or both, of either the gripping member or releasing elements can move. This is a mater of changing the activation mechanisms and is a modification that will be dependent upon end use and manufacturing costs.

Figure 33:
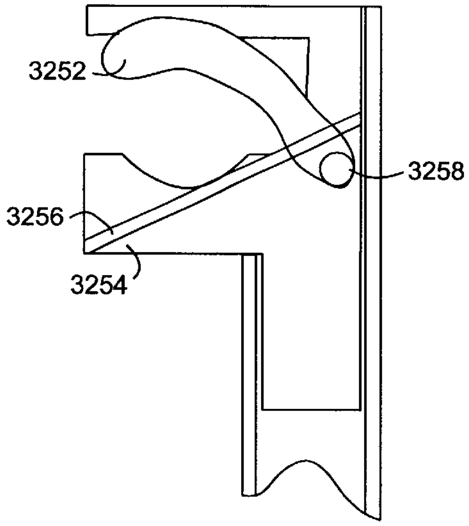
FIG. 33 is a side view of an alternate spring system for use with the hand tool of FIG. 30.

In FIG. 33, the leaf spring 3006 has been replaced with an embedded spring 3254 as described heretofore. The placement of the spring 3256 must be such that it passes between the pivot 3258 and the open arc formed by the pivoting upper gripping member 3252 and the stationary lower gripping member 3254.

In the embodiments that incorporate springs, it should be noted that best results are achieved when the spring is used in conjunction with the coupling release members rather than the conduit gripping members.

Figure 34:
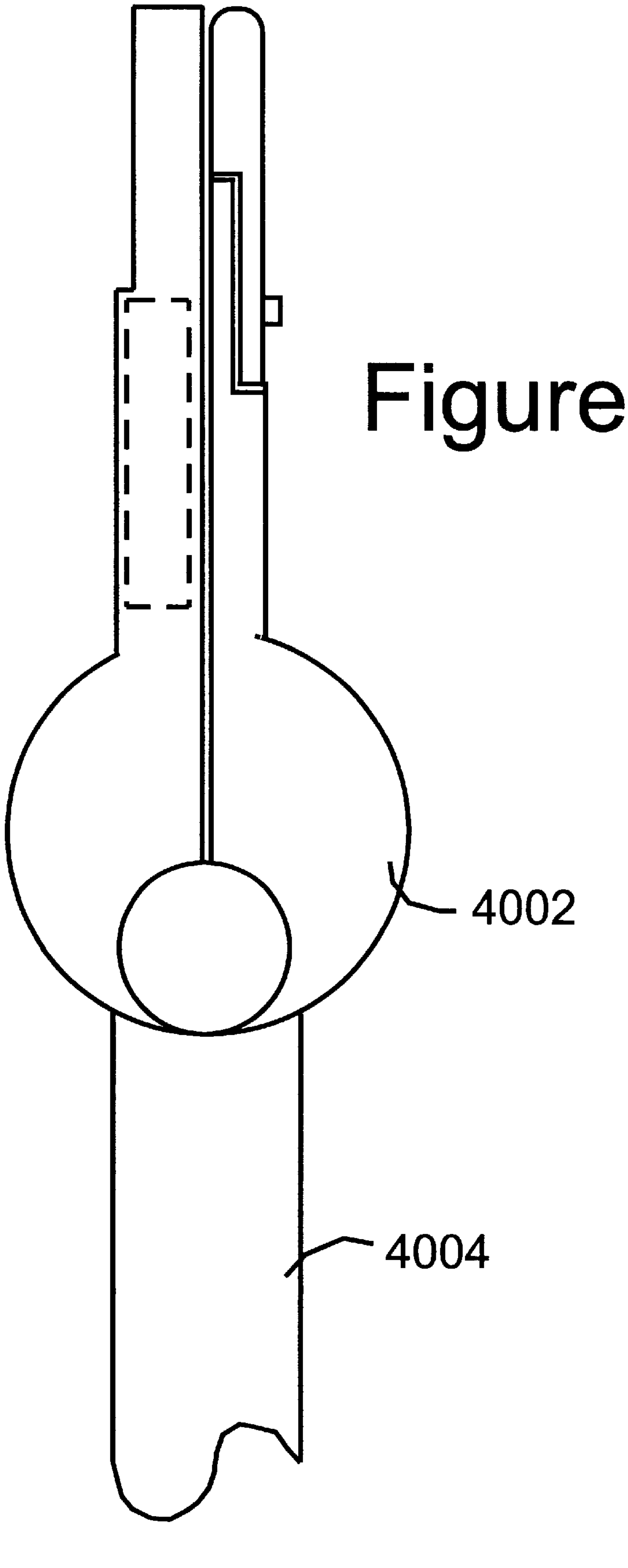
FIG. 34 is a front view of an alternate hand tool adapted for use with an air compressor.

In the hand tool 4000 illustrated in FIG. 34 the handles have been replaced with a connector/handle 4004 for use with an air generator, electricity or other power source. The size of the body 4002 has been in this embodiment has been reduced, however the sizing will be dependent upon the power source, linkages, etc. The clamping action can be achieved through any method known in the art, such as a motor, and will be obvious to those skilled in the mechanical arts.

Although the foregoing illustrates represent the preferred embodiments, it should be noted that arcs as used in both the release elements and the gripping members are optional. Any of the embodiments can use all arced surfaces, all flat surfaces or a combination thereof. It is preferable that the foregoing gripping members have either teeth, such as pliers, or some type of non-slide coating that prevents the conduit from slipping. In some instances, it may be beneficial to use both the teeth and a rubber coating and the obvious use of one or the other, or a combination thereof will be obvious to those skilled in the art.

It should be noted that although the description of the action of the hand tool is described as three specific stages, in actual use the motion is smooth and sufficiently rapid to eliminate any separate, specific stages. The mechanism used to translate the movement of the handles to the gripping head, as illustrated herein, is an example of one method and different mechanical methods of translating the movement of the handles to the movement of the head will be obvious. The novelty lies in the gripping and separating action, rather than how this action is achieved and the motion exchange from handles to air tool will be obvious to those skilled in the mechanical arts.

What is claimed is:

1. A tool for the removal of quick release couplings from a conduit, said tool having a body portion, said body portion having:

a gripping portion, said gripping portion having a first end and a second end, and a release portion, said release portion having a first end and a second end, said gripping portion and said release portion being rotatably connected by a pivot connection, a pair of handles, a first of said handles connected to said gripping portion second end and a second of said handles connected to said release portion second end, a spring, said spring being affixed to said handles and maintaining said pair of handles at a maximum separation distance, said maximum separation distance maintaining said gripping portion first end and said release portion first end adjacent one another, a gripping element, said gripping element being affixed to said gripping portion and having a receiving member and a clamping member, said receiving member and said clamping member forming a conduit retaining area, at least one of said receiving member and said clamping member being connected to a linkage between at least one of said receiving member and said clamping member and said first handle, a release element, said release element having a first plate and a second plate and being affixed to said release portion first end, wherein compressing said handles causes said receiving member and said clamping member to compress toward one another and said gripping portion and said release portion to rotate around said pivot connection, thereby creating distance between said gripping element and said release element.

2. The tool of claim 1 wherein said second handle is non-movably secured to said body.

3. The tool of claim 1 wherein said receiving member is stationary.

4. The tool of claim 1 wherein said first plate of said release element is stationary.

5. The tool of claim 4 wherein said second plate of said release element is stationary.

6. The tool of claim 4 wherein said second plate is rotatably affixed to said release element first end.

7. The tool of claim 6 further comprising a spring, said spring maintaining said release element second plate adjacent to said first plate.

8. The tool of claim 7 wherein said spring is a leaf spring between said second plate and said release element.

9. The tool of claim 7 wherein said spring is recessed within said second plate and at least a portion of said release element.

10. The tool of claim 1 wherein said clamping member has at least one arc.

11. The tool of claim 10 wherein said receiving member is a mirror image of said clamping member.

12. The tool of claim 1 further comprising a guide, said guide being affixed to said gripping portion and being adjacent said clamping member to prevent said clamping member from side to side movement.

13. The tool of claim 1 wherein said clamping member and said release element open at said first end of said release portion and said gripping portion to receive said conduit.

14. The tool of claim 13 wherein said second plate is rotatably affixed to said release portion and said first plate is stationary to said release portion, said second plate being maintained adjacent to said second plate by a spring.

15. The tool of claim 13 wherein said clamping member is connected to said linkage and rotates from an open position distanced from said receiving member when said handles are at a maximum distance to adjacent to said receiving member when said handles are compressed.

16. The tool of claim 1 wherein said clamping member and said release element open at a right angle to said first end of said body portion.

17. The tool of claim 16 wherein said second plate is rotatably affixed to said release portion and said first plate is stationary to said release portion, said second plate being maintained adjacent to said second plate by a spring.

18. The tool of claim 16 wherein said clamping member is connected to said linkage and moves from an open position distanced from said receiving member when said handles are at a maximum distance to adjacent to said receiving member when said handles are compressed.

19. The tool of claim 16 further comprising a guide, said guide being stationary to said gripping portion and adjacent to said clamping member, thereby preventing said clamping member from moving side to side.

20. The tool of claim 1 wherein at least one of said first plate and said second plate are connected to said linkage and are compressed together when said handles are compressed.

21. The tool of claim 1 wherein said receiving member and said clamping member have non-slip means to prevent said conduit from sliding within said conduit retaining area.

22. The tool of claim 21, wherein said release member includes a pair of spaced apart release jaw members, and wherein the space between said spaced apart release jaw member is said quick release coupling receiving region, said quick release coupling receiving region having a region in which said spaced apart release jaw members are spaced apart by a distance that is less than the maximum diameter of said quick release coupling.

23. The tool of claim 22, wherein said actuator member comprises:

a pair of handles, said pair of handles being biased away from each other, a first of said handles being linked to said conduit gripping member, for relative movement of said gripping member first end toward said gripping member second end upon movement of said pair of handles toward each other, and for relative movement of pair of spaced apart release jaw members away from conduit gripping member, upon movement of said pair of handles toward each other.

24. The tool of claim 23, wherein said actuator member comprises:

a pair of handles, said pair of handles being biased away from each other, a first of said handles being linked to said conduit gripping member by a linking member, for relative movement of said gripping member first end toward said gripping member second end upon movement of said pair of handles from a first spaced apart position, toward each other to a second relatively closer position, and for relative movement of pair of spaced apart release jaw members away from conduit gripping member, upon movement of said pair of handles toward each other, from said second spaced apart position, toward each other to a third relatively closer position.

25. The tool of claim 24, wherein initial movement of said linking member moves said gripping member first end toward said gripping member second end, until said gripping member first end and second end engage said conduit and are in a fixed gripping position, and subsequent movement of said linking member produces relative movement of pair of spaced apart release jaw members away from conduit gripping member.

26. The tool of claim 24, said tool having a conduit engaging end and a handle end, said gripping member and said release jaw members being at said conduit engaging end and said pair of handle being at said handle end, said first handle being linked to said linking member by a coupling member, said linking member having a first end fixed to one of said gripping member first end or said second end, said coupling member having a first end in moveable engagement with said first handle and a second end in movable engagement with said linking member, wherein said handles initially move about an axis toward each and moves said linking member from said conduit engaging end toward said handle end until said gripping member first end and second end are in a fixed gripping position, and subsequent movement of said handles toward each other moves said linking member about said axis and said movement of said linking member about said axis moves said gripping member about said axis.

27. A tool for the removal of quick release couplings from a conduit, said tool comprising:

a conduit gripping member, said gripping member having a first end and a second end, said first end and said second end being movable relative to each other from a first position to a second position, said gripping member first end and second end being biased toward said second position and being closer together in said first position than in said second position, a release member, said release member having a quick release coupling receiving region, said release member being biased toward a third position and being movable from said third position to a fourth position, said release member being closer to said conduit gripping member when in said third position than when in said fourth position, an actuator member, said actuator being operatively connected to said gripping member and to said coupling release member, such that upon actuation of said actuation member, said gripping member first end and said end moves from said first position to said second position, and said coupling release member moves from said third position to said fourth position.

28. The tool of claim 27, wherein said conduit gripping member first end is a first jaw member and said conduit gripping member second end is a second jaw member, said first jaw member being stationary relative to said actuator member and said second jaw member being movable relative to said first jaw member, said second jaw member being movable under sufficient force toward said first jaw member, when said gripping member is in said second position, to apply a force to a conduit positioned between said first jaw and said second jaw, to restrict relative movement between said gripping member and said conduit.

29. The tool of claim 21, wherein said release member includes a pair of spaced apart release jaw members, and wherein the space between said spaced apart release jaw members is said quick release coupling receiving region, said quick release coupling receiving region having a region in which said spaced apart release jaw members are spaced apart by a distance that is less than the maximum diameter of said quick release coupling.

30. The tool of claim 21, wherein said actuator member comprises:

a pair of handles, said pair of handles being biased away from each other, a first of said handles being linked to said conduit gripping member, for relative movement of said gripping member first end toward said gripping member second end upon movement of said pair of handles toward each other.

* * * * *